(12) United States Patent
Goto (10) Patent No.: US 8,451,117 B2
(45) Date of Patent: May 28, 2013

(54) CONTENT PROCESSING SYSTEM CAPABLE OF EVENT DETECTION AND CONTENT MANAGEMENT

(75) Inventor: Hiroshi Goto, Ibaraki (JP)

(73) Assignee: Empire Technology Development LLC, Wilmington, DE (US)

( * ) Notice: Subject to any disclaimer, the term of this patent is extended or adjusted under 35 U.S.C. 154(b) by 648 days.

(21) Appl. No.: 12/645,495

(22) Filed: Dec. 23, 2009

(65) Prior Publication Data

US 2011/0148628 A1    Jun. 23, 2011

(51) Int. Cl.
*G08B 13/14* (2006.01)

(52) U.S. Cl.
USPC .............. 340/568.1; 340/568.2; 340/568.8; 340/571

(58) Field of Classification Search
USPC .............. 340/539.1, 539.11, 539.26, 573.1, 340/691.2, 692, 506, 568.1, 568.2, 568.3, 340/568.8, 571; 375/224; 600/509, 513; 235/385; 345/173
See application file for complete search history.

(56) References Cited

U.S. PATENT DOCUMENTS

| | | | |
|---|---|---|---|
| 6,611,556 B1 * | 8/2003 | Koerner et al. | 375/224 |
| 7,080,778 B1 * | 7/2006 | Kressin et al. | 235/385 |
| 7,292,151 B2 * | 11/2007 | Ferguson et al. | 340/573.1 |
| 7,292,628 B2 * | 11/2007 | Koerner et al. | 375/224 |
| 7,492,268 B2 * | 2/2009 | Ferguson et al. | 340/573.1 |
| 7,539,533 B2 * | 5/2009 | Tran | 600/509 |
| 7,558,622 B2 * | 7/2009 | Tran | 600/509 |
| 7,602,301 B1 * | 10/2009 | Stirling et al. | 340/573.1 |
| 7,701,339 B2 * | 4/2010 | Irmscher et al. | 340/568.1 |
| 7,733,224 B2 * | 6/2010 | Tran | 340/540 |
| 7,952,483 B2 * | 5/2011 | Ferguson et al. | 340/573.1 |
| 8,089,357 B2 * | 1/2012 | Irmscher et al. | 340/568.1 |

* cited by examiner

*Primary Examiner* — Van T. Trieu
(74) *Attorney, Agent, or Firm* — Ren-Sheng International (57) ABSTRACT

In accordance with at least some embodiments, a process for transmitting a signal is presented. The process may be implemented to detect an occurrence of a predetermined event associated with an object and in response to detecting the occurrence of the predetermined event, transmit a signal relating to a content associated with the object.

27 Claims, 7 Drawing Sheets

| Event | Condition(s) | Response |
|---|---|---|
| Event 1 | Detect vibration | Transmit Content 1 |
| Event 2 | Detect elapse of 30 seconds after sending Content 1 | Transmit Content 2 |
| Event 3 | Detect elapse of 15 seconds of continued inactivity after sending Content 2 and after detecting stop of vibration | Stop outputting Content 2 |

Event Response
Table <u>300</u>

| Event | Condition(s) | Response |
|---|---|---|
| Event 1 | Detect vibration | Transmit Content 1 |
| Event 2 | Detect elapse of 30 seconds after sending Content 1 | Transmit Content 2 |
| Event 3 | Detect elapse of 15 seconds of continued inactivity after sending Content 2 and after detecting stop of vibration | Stop outputting Content 2 |

Event Response Table 300

(700) A computer program product (704) machine-readable instructions, which, if executed by one or more processors, may operatively enable a computing device to:

detect an occurrence of a predetermined event associated with an object; and/or transmit a signal relating to a content associated with the object, in response to the detecting an occurrence of a predetermined event.

| (706) A computer-readable medium | (708) A recordable medium | (710) A communications medium |

CONTENT PROCESSING SYSTEM CAPABLE OF EVENT DETECTION AND CONTENT MANAGEMENT

BACKGROUND

Unless otherwise indicated herein, the approaches described in this section are not prior art to the claims in this application and are not admitted to be prior art by inclusion in this section.

Augmented reality (AR) techniques for merging real-world environmental elements with virtual computer-generated imagery are gaining popularity, especially in the advertising and entertainment industries. AR techniques may also be utilized in other industries to enhance user experience and improve customer satisfaction.

BRIEF DESCRIPTION OF THE DRAWINGS

The foregoing and other features of the present disclosure will become more fully apparent from the following description and appended claims, taken in conjunction with the accompanying drawings. These drawings depict only several embodiments in accordance with the disclosure and are, therefore, not to be considered limiting of its scope. The disclosure will be described with additional specificity and detail through use of the accompanying drawings.

DETAILED DESCRIPTION

The following description sets forth various examples along with specific details to provide a thorough understanding of claimed subject matter. It will be understood by those skilled in the art, however that claimed subject matter may be practiced without some or more of the specific details disclosed herein. Further, in some circumstances, well-known methods, procedures, systems, components and/or circuits have not been described in detail in order to avoid unnecessarily obscuring claimed subject matter. In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

This disclosure is drawn, inter alia, to methods, apparatus, systems and/or computer program products related to a content processing system capable of event detection associated an object and content management also associated with the object.

Figure 1:
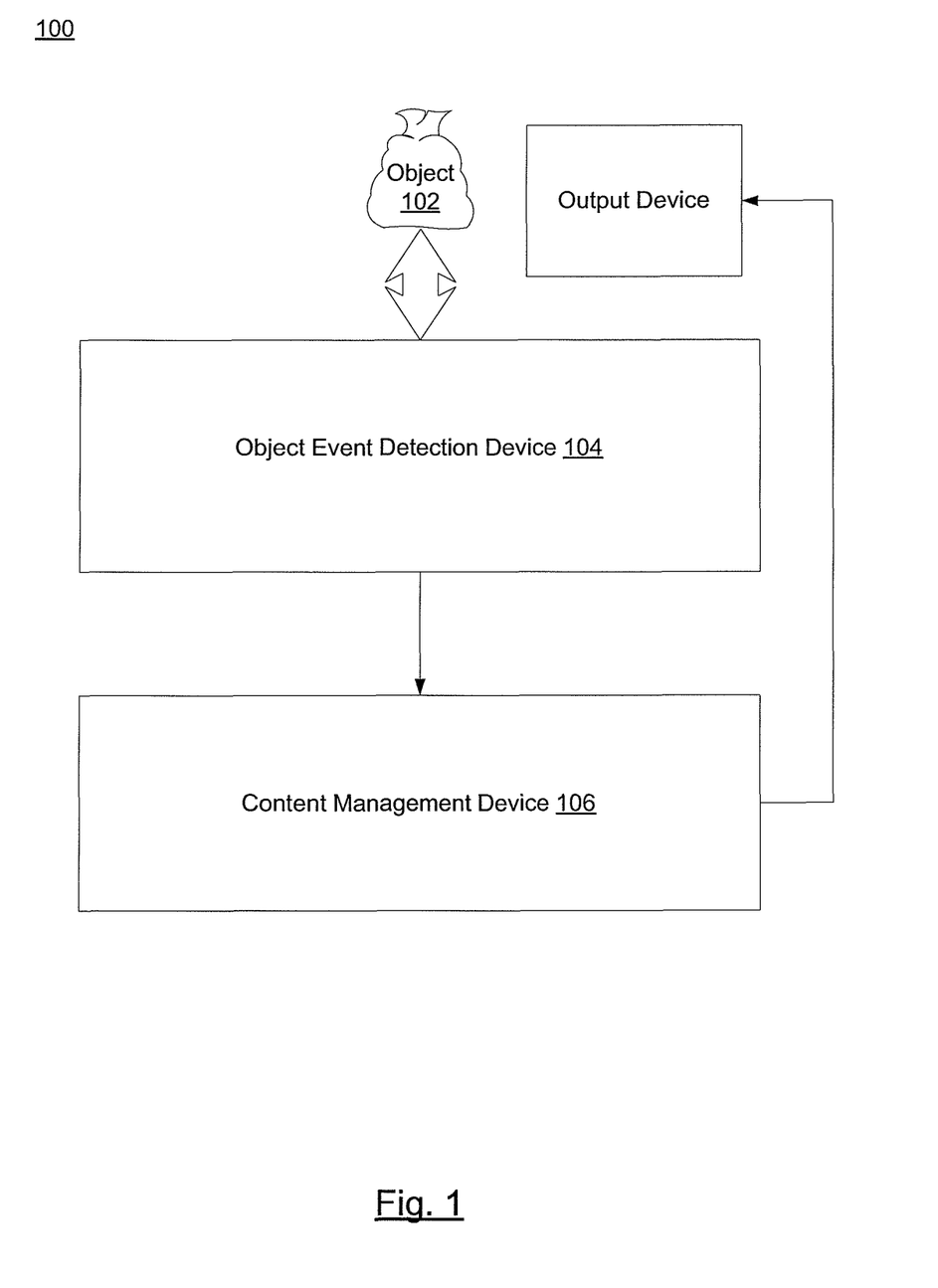
FIG. 1 illustrates an example content processing system capable of detecting an event associated with an object and identifying content associated with the object.

FIG. 1 illustrates an example content processing system 100 capable of detecting an event associated with an object 102 and managing content associated with the object, in accordance with at least some embodiments of the present disclosure. In the illustrated example, the content processing system 100 may include an object event detection device 104 and a content management device 106. The object event detection device 104 may be attached or coupled to the object 102. Examples of the objects 102 include, but not limited to, a box or a package for a commercial product such as a toy, a music CD, a book, and the like. The object event detection device 104 may be configured to transmit one or more signals relating to one or more content associated with the object 102 to the content management device 106, in response to detecting an occurrence of one or more events associated with the object 102. The content management device 106 may be configured to receive the one or more signals from the object event detection device 104, and perform an action relating to the content for the object 102 based at least in part on the received signals. For example, when a certain event associated with the object 102 is determined to have occurred (e.g., the object 102 is picked up for a period of time), the content associated with the object 102 (e.g., advertisement) may be retrieved to be outputted to an output device (e.g., a display device) physically nearby the object 102.

Figure 2:
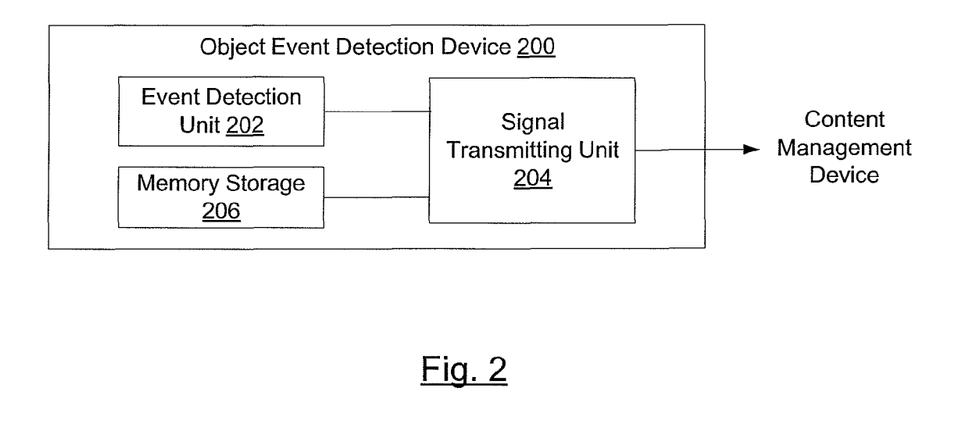
FIG. 2 illustrates a schematic diagram of an example object event detection device.

FIG. 2 illustrates a schematic diagram of an example object event detection device 200, in accordance with at least some embodiments of the present disclosure. In the illustrated example, the object event detection device 200 may include an event detection unit 202, a signal transmitting unit 204, and/or memory storage 206.

In some implementations, the event detection unit 202 may be configured to detect an occurrence of a predetermined event associated with an object that may be coupled to the object event detection device 200. The event detection unit 202 may include a processing unit, a sensor, and/or a timer. For example, the event detection unit 202 may detect the movement, such as the vibration, of an object with a sensor such as, but not limited to, a piezoelectric sensor and an accelerometer. Other types of sensors utilized in the event detection unit 202 may include, but not limited to, an angle sensor and a pressure sensor. In addition, other examples of a predetermined event may include the elapse of a certain period of time after the occurrence of a particular event, a change to the tilt angle associated with the object, a contact made on an identifiable location of the object, a stop of the movement associated with the object, and the like. Moreover, the event detection unit 202 may detect more than one event and also the sequence in which the multiple events occur. For example, the event detection unit 202 may detect the vibration of an object at first (e.g., a first predetermined event) and then detect the elapse of 30 seconds after the initial vibration (e.g., a second predetermined event). This sequence of event occurrences may correspond to a scenario in which a product is picked up and remains held for the 30-second period, indicating in this case that no purchasing decision for the product may have been made. Such a sequence may result in initiating the outputting of the first content associated with the object (e.g., a first advertisement for this product) and then initiating the outputting of the second content (e.g., a second advertisement for the same product) also associated with the object 30 seconds later. In another example, the event detection unit 202 may detect the vibration of an object, a stop of the vibration, and then the elapse of 15 seconds of continued inactivity after the stop of the vibration. This sequence of event occurrences may correspond to a scenario in which a product is picked up but is subsequently returned. Such a sequence may result in initiating the outputting of the content associated with the object and then stopping the outputting of the content 15 seconds after having detected the stop of the vibration.

In response to the detection of one or more predetermined events as discussed above, the signal transmitting unit 204 may be configured to transmit one or more signals relating to the content associated with the object coupled to the object event detection device. The one or more signals may include, but not limited to, content data, content identifier, and/or control information, all associated with the object.

In some implementations, the signal transmitting unit 204 may be configured to transmit a signal that includes content data associated with the object to a content management device, such as the content management device 106 of FIG. 1. Some examples of content data may include, but not limited to, previews, interviews, and reviews associated with the object in the form of video data, audio data, image data, textual data, and the like. Such content data may be stored in the memory storage 206. In response to the event detection unit 202 having detected an occurrence of a predetermined event, the signal transmitting unit 204 may be configured to retrieve the content data from the memory storage 206, embed the content data in the signal to be transmitted, and transmit the signal to a content management device. The signal can be a radio frequency signal, an ultra-sonic frequency signal, and/or an infrared signal.

In other implementations, the signal transmitting unit 204 may be configured to transmit a signal that includes a content identifier for a content associated with the object. This specific content may be outputted by a content management device. The content identifier may include identification information associated with the content to be outputted and/or location information of the content database storing the content. Subsequent discussions found herein, such as for FIG. 4, will further detail the operations of retrieving content based on a content identifier.

In still other implementations, the signal transmitting unit 204 may be configured to transmit a signal including control information relating to a content associated with the object. The control information may include, but not limited to, type(s) of information (e.g., content data, content identifier, control information, and the like) included in the signal and also control operation(s) requested to be performed. Using the example of detecting the elapse of 15 seconds of continued inactivity discussed above, in response to such a sequence of event occurrences, the signal transmitting unit 204 may transmit a signal including the control information to request a content management device to stop any outputting of the content.

Figure 3:
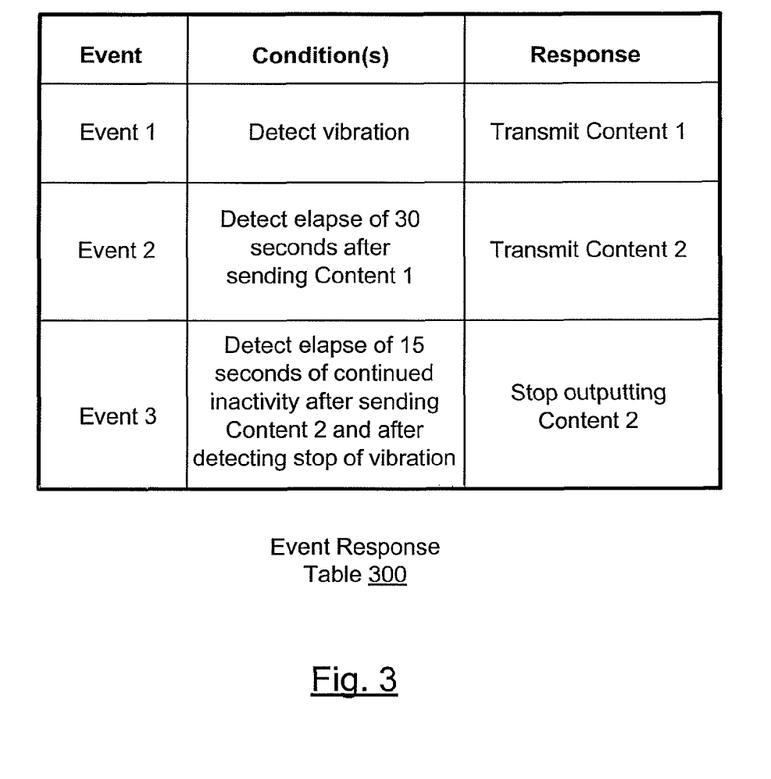
FIG. 3 illustrates a schematic diagram of an example scenario definition table.

The various scenarios supported by the object event detection device 104 may be defined in an event response table, which may be stored in the memory storage 206. FIG. 3 illustrates a schematic diagram of an example event response table 300, in accordance with at least some embodiments of the present disclosure. In the illustrated example, the event response table 300 may include a set of events, each of which may correspond to one or more conditions. The event response table 300 may also include a set of responses when the conditions are satisfied. In the illustrated example, Event 1 is deemed to have occurred, when the condition of detecting vibration is satisfied. The response for the occurrence of Event 1 is to transmit Content 1. Event 2 is deemed to have occurred, when the condition of detecting the elapse of 30 seconds after sending Content 1 is satisfied. The response for the occurrence of Event 2 is to transmit Content 2. Event 3 is deemed to have occurred, when the condition of detecting the elapse of 15 seconds of continued inactivity after sending Content 2 and after detecting stop of vibration is satisfied. The response for the occurrence of Event 3 is to stop outputting Content 2. Based on the responses defined the event response table 300, the signal transmitting unit 204 may be configured to determine whether to include content data, content identifier, and/or control signal in a signal to be transmitted to a content management device, such as the content management device 106 of FIG. 1.

In some implementations, the signal transmitting unit 204 may be further configured to encode the signal to be transmitted, especially if the signal includes content data. This may help to prevent unauthorized reproduction of the transmitted content data. The recipient of the transmitted signal may be required to include authentication capabilities to properly decode and reproduce the content data.

Figure 4:
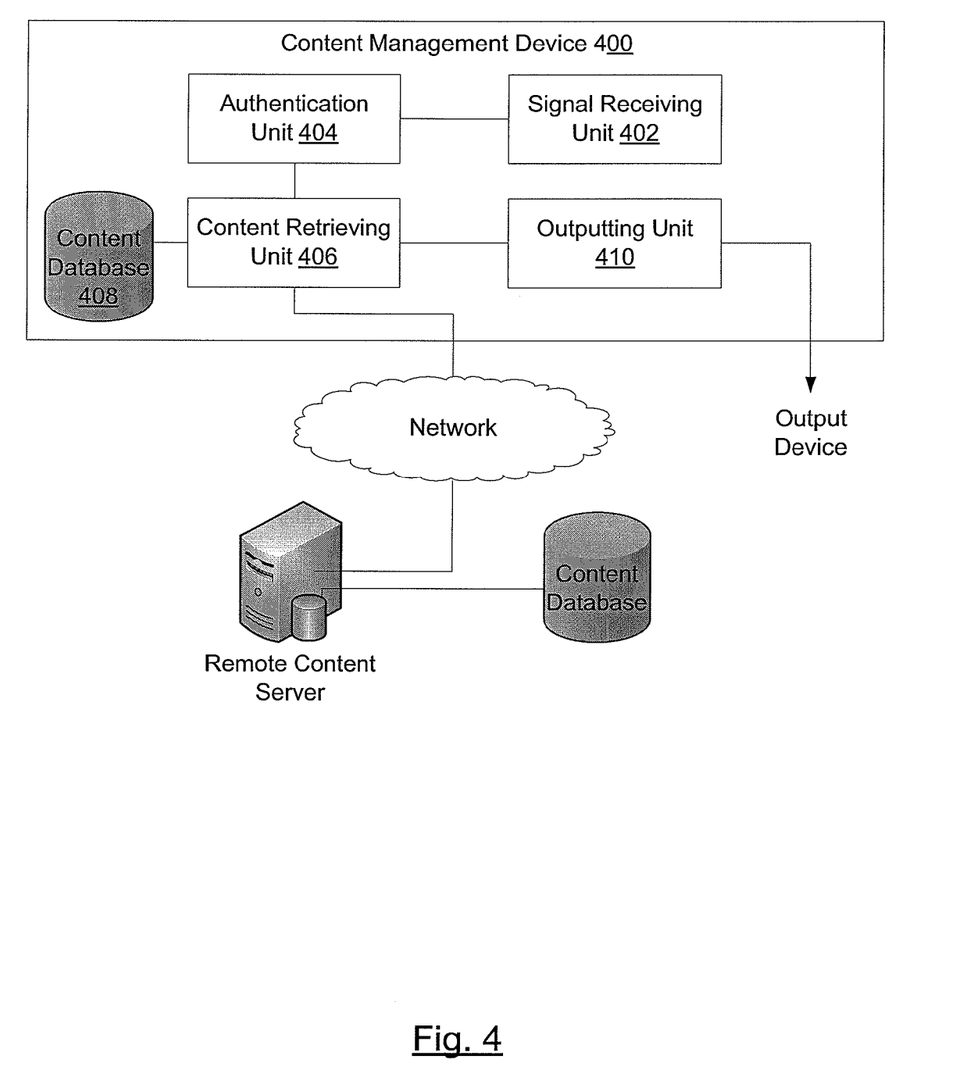
FIG. 4 illustrates a schematic diagram of an example content identification device.

FIG. 4 illustrates a schematic diagram of an example content management device 400, in accordance with at least some embodiments of the present disclosure. In the illustrated example, the content management device 400 may include a signal receiving unit 402, an authentication unit 404, a content retrieving unit 406, a content database 408, and a content outputting unit 410. Some examples of the content management device 400 may include, but not limited to, a personal computer (PC), a mobile device, a mobile phone, a PDA, a tablet PC, and the like.

The signal receiving unit 402 may be configured to receive one or more signals from an object event detection device, such as the object event detection device 104 of FIG. 1. For example, the signal receiving unit 402 may utilize a microphone to receive audio signals from the object event detection device. The signal receiving unit 402 may also utilize other devices (e.g., a radio receiver, a modulated ultrasound receiver, and the like) to receive signals via various communication channels.

The content retrieving unit 406 may be configured to analyze the one or more signals received by the signal receiving unit 402 and perform an action based on the results of such analysis. In some implementations, when the received signal is determined to include content data (e.g., video, audio, text contents) associated with an object such as a toy, a music CD, a book, and the like, the content retrieving unit 406 may be configured to retrieve such content data from the received signal.

In other implementations, when the received signal is determined to include a content identifier for identifying the content to be outputted, the content retrieving unit 406 may be configured to retrieve the content from a content database based on the content identifier. Here, as discussed above, the content identifier may include identification information associated with the content data and/or location information of the content database. The content database (e.g., the content database 408 or a content database at or near a remote content server) accessible by the content retrieving unit 406 may contain a set of different contents, each of which may be identified by the content identifier. An example content database may be the content database 408 physically at or near the content management device 400. Alternatively, another example content database may correspond to the illustrated content database of FIG. 4 near a remote content server.

In still other implementations, when the received signal is determined to include control information, such as, but not limited to, type(s) of information (e.g., content data, content identifier, control information, and the like) included in the signal and control operation(s) requested to be performed, the content management device 400 may be configured to perform an action. Specifically, when the control information indicates that the received signal includes content data or content identifier, the content retrieving unit 406 may retrieve content data in manners as discussed above. When the control information indicates that the received signal includes a control operation requested to be performed, the content retrieving unit 406 may direct the requested control operation to another unit. For example, when the requested control operation is to stop outputting a specific content, the content retrieving unit 406 may direct the requested control operation to the outputting unit 410.

In some implementations, the outputting unit 410 may support rendering capabilities. Thus, when the outputting unit 410 receives content data from the content retrieving unit 406, the outputting unit 410 may be configured to render the received content data before outputting the rendered content to an output device. When the outputting unit 410 receives the requested control operation, such as to stop outputting a specific content, the outputting unit 410 may terminate any rendering and outputting of the specific content.

The authentication unit 404 may be configured to verify whether the content management device 400 is authorized to retrieve the content data associated with an object. The one or more signals received from a content transmitting unit may be encoded, and the authentication unit 404 may request for certain input data, such as, but not limited to, the product identification number, bar code, and/or audio signature associated with the object, to perform the verification. To illustrate, suppose a music CD is legally purchased. With the bar code of the music CD, additional contents associated with the music CD, such as a video interview with the singer of the music CD, may be displayed on a display device nearby the physical location of the music CD.

Figure 5:
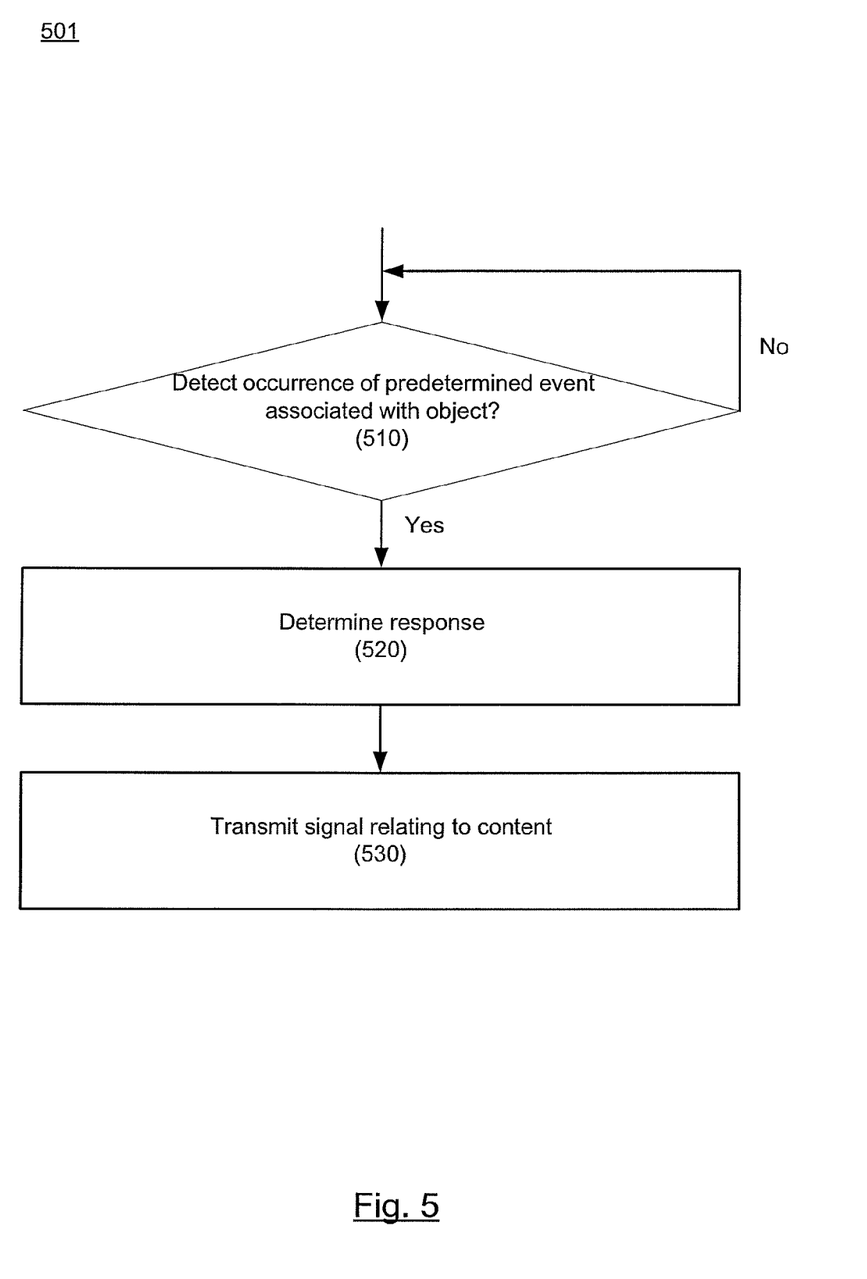
FIG. 5 illustrates an example process for content processing method.

FIG. 5 illustrates a flow diagram of an example process 501 for transmitting a signal relating to content, in accordance with at least some embodiments of the present disclosure. The process 501 set forth various functional blocks or actions that may be described as processing steps, functional operations, events, and/or acts, etc., which may be performed by hardware, software, and/or firmware. Those skilled in the art in light of the present disclosure will recognize that numerous alternatives to the functional blocks shown in FIG. 5 may be practiced in various implementations. In one embodiment, machine-executable instructions for the process 501 may be stored in memory, executed by a processor, and/or implemented in the object event detection device 200 of FIG. 2.

Process 501 may begin at block 510, "Detect occurrence of predetermined event associated with object." Block 510 may be followed by block 520, "Determine response." Block 520 may be followed by block 530, "Transmit signal relating to content." Although the blocks are illustrated in a sequential order, these blocks may also be performed in parallel, and/or in a different order than those described herein. Also, the various blocks may be combined into fewer blocks, divided into additional blocks, and/or eliminated based upon the desired implementation.

At block 510, an object event detection device may compare the data captured by its sensor(s) against one or more conditions defined in an event response table, such as the vent response table 300 of FIG. 3, to determine whether one or more predetermined events have occurred. If a predetermined event is determined to have occurred, then process 501 may proceed to block 520. Otherwise, the object event detection device may continue to look for an occurrence of a predetermined event.

At block 520, the object event detection device may search through the event response table to determine the appropriate response corresponding to the occurrence of the predetermined event. For example, referring back to FIG. 3, when Event 2 is determined to have occurred, based on the event response table 300, the response is to transmit Content 2.

At block 530, based on the determined response, the object event detection device may prepare a signal relating to content to be transmitted and transmit this signal relating to content to a content management device. The signal is relating to content, because it may include content data, content identifier, and/or control information having control operation requested to be performed on content. Continuing with the same example above, based on the response to transmit Content 2, the object event detection device may prepare and transmit a signal including the content data of Content 2, a signal including a content identifier for Content 2, or a signal including control information associated with Content 2.

Figure 6:
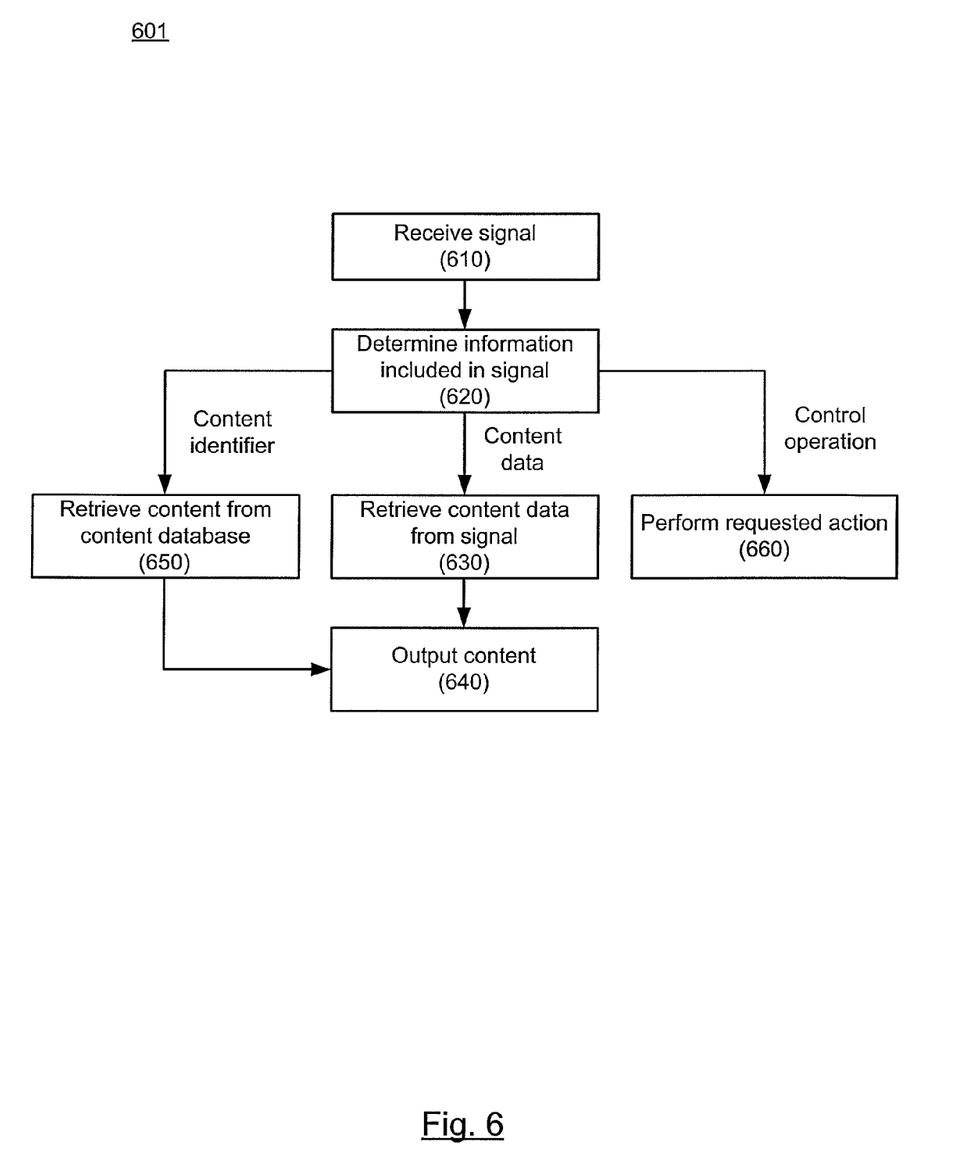
FIG. 6 illustrates an example computer program product.

FIG. 6 illustrates a flow diagram of an example process 601 for receiving and responding to a signal relating to content, in accordance with at least some embodiments of the present disclosure. The process 601 set forth various functional blocks or actions that may be described as processing steps, functional operations, events, and/or acts, etc., which may be performed by hardware, software, and/or firmware. Those skilled in the art in light of the present disclosure will recognize that numerous alternatives to the functional blocks shown in FIG. 6 may be practiced in various implementations. In one embodiment, machine-executable instructions for the process 601 may be stored in memory, executed by a processor, and/or implemented in the content management device 400 of FIG. 4.

Process 601 may begin at block 610, "Receive signal." Block 610 may be followed by block 620, "Determine information included in signal." Based on the outcome of block 620, block 620 may be followed by block 630, "Retrieve content data from signal," block 650, "Retrieve content from content database," or block 660, "Perform requested action." Each of block 630 and block 650 may be followed by block 640, "Output content." Although the blocks are illustrated in a sequential order, these blocks may also be performed in parallel, and/or in a different order than those described herein. Also, the various blocks may be combined into fewer blocks, divided into additional blocks, and/or eliminated based upon the desired implementation.

At block 610, a content management device may receive a signal relating to a content, which is associated with an object, from an object event detection device.

At block 620, the content management device may determine the information included in the received signal. When the received signal is determined to include content data, process 601 may proceed to block 630. When the received signal is determined to include a content identifier, process 601 may proceed to block 650. When the received signal is determined to include control information having control operation(s) requested to be performed, process 601 may proceed to block 660.

At block 630, the content management device may retrieve the content data associated with the object from the received signal. In some implementations, before the content data may be retrieved, the content management device may be configured to perform an authentication process to ensure that it is authorized to retrieve and/or process the content data.

At block 650, the content management device may retrieve the content associated with the object from either a local content database or a remote content database based at least in part the content identifier included in the received signal.

At block 660, the content management device may perform an action, such as stopping the outputting of a specific content, based on the control information included in the received signal. The control information here may include such a control operation request to stop the outputting of the specific content.

At block 640, the content management device may output the content associated with the object. In some implementations, the content may be outputted to an output device (e.g., a display device or a audio playback device) that is near the physical location of the object.

Figure 7:
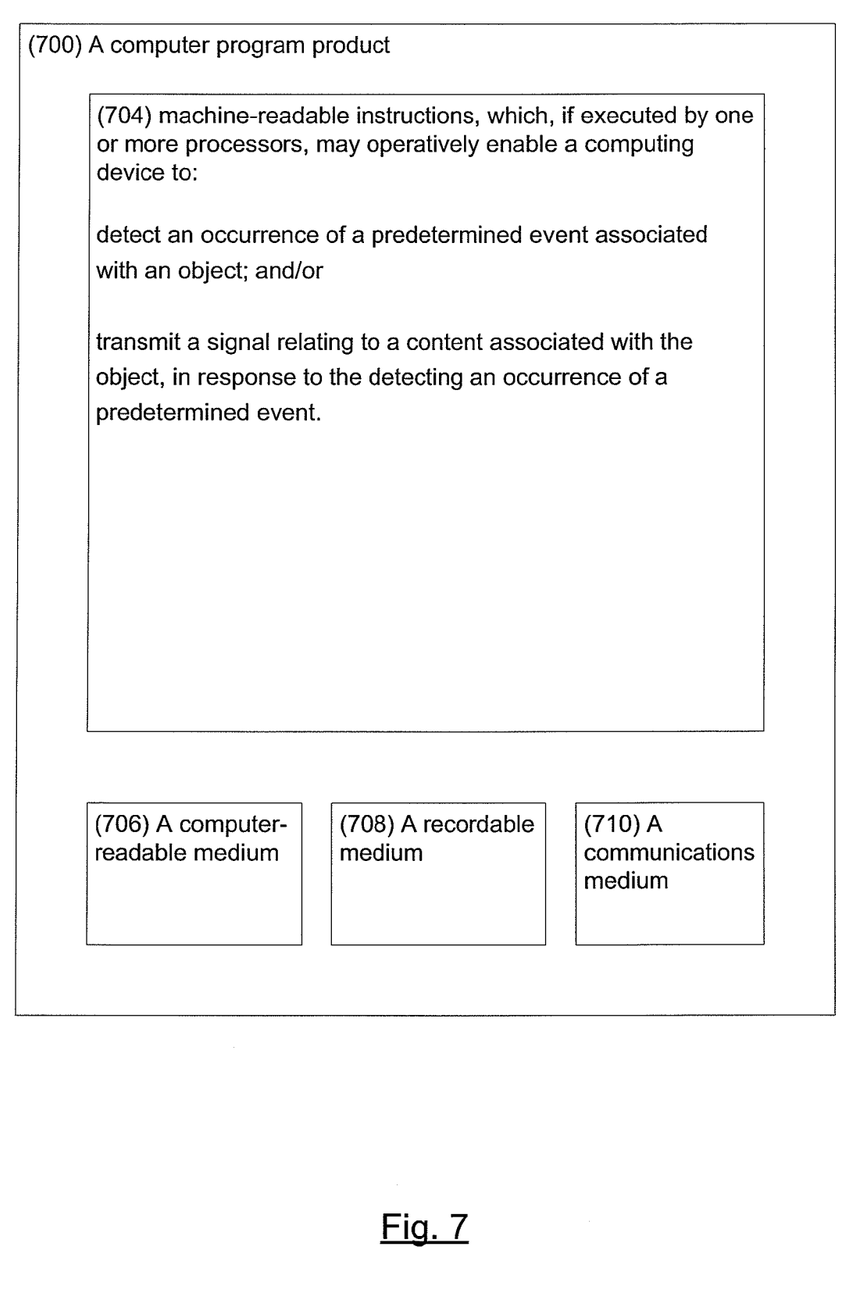
FIG. 7 is a block diagram illustrating an example computing device, all arranged in accordance with at least some embodiments of the present disclosure.

FIG. 7 illustrates an example computer program product 700 that is arranged in accordance with the present disclosure. Program product 700 may include one or more machine-readable instructions 704, which, if executed by one or more processors, may operatively enable a computing device to provide the functionality described above. Thus, for example, referring to the system of FIG. 2, the object event detection device 200 may undertake one or more of the operations shown in at least FIG. 5 in response to instructions 704.

In some implementations, the program product 700 may encompass a computer-readable medium 706, such as, but not limited to, a hard disk drive, a Compact Disc (CD), a Digital Versatile Disk (DVD), a digital tape, memory, etc. In some implementations, the program product 700 may also encompass a recordable medium 708, such as, but not limited to, memory, read/write (R/W) CDs, R/W DVDs, etc. In some implementations, the program product 700 may encompass a communications medium 710, such as, but not limited to, a digital and/or an analog communication medium (e.g., a fiber optic cable, a wired communications link, a wireless communication link, etc.).

Figure 8:
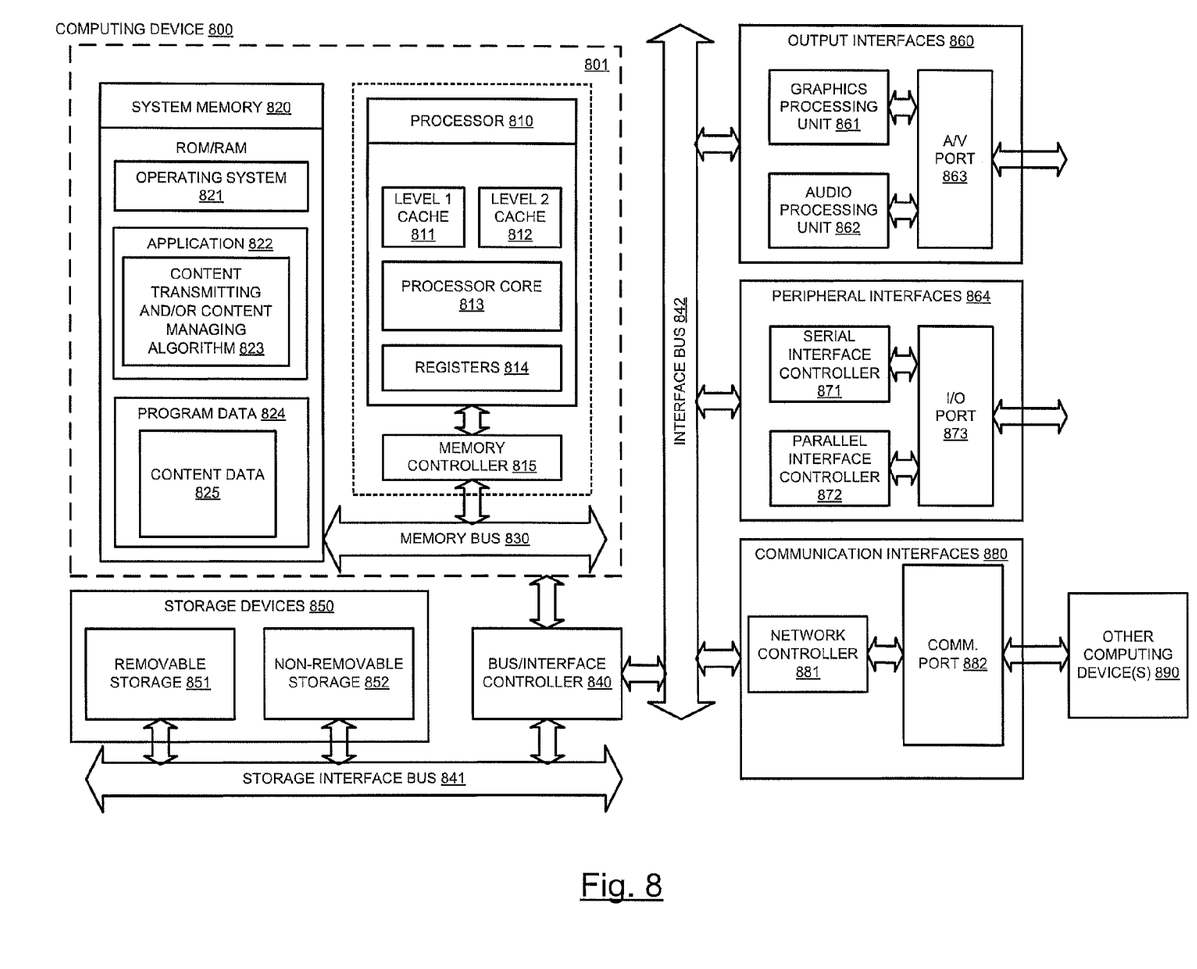

FIG. 8 is a block diagram illustrating an example computing device 800 that is arranged in accordance with the present disclosure. In one example configuration 801, computing device 800 may include one or more processors 810 and system memory 820. A memory bus 830 can be used for communicating between the processor 810 and the system memory 820.

Depending on the desired configuration, processor 810 may be of any type including but not limited to a microprocessor (µP), a microcontroller (µC), a digital signal processor (DSP), or any combination thereof. Processor 810 can include one or more levels of caching, such as a level one cache 811 and a level two cache 812, a processor core 813, and registers 814. The processor core 813 can include an arithmetic logic unit (ALU), a floating point unit (FPU), a digital signal processing core (DSP Core), or any combination thereof. A memory controller 815 can also be used with the processor 810, or in some implementations the memory controller 815 can be an internal part of the processor 810.

Depending on the desired configuration, the system memory 820 may be of any type including but not limited to volatile memory (such as RAM), non-volatile memory (such as ROM, flash memory, etc.) or any combination thereof. System memory 820 may include an operating system 821, one or more applications 822, and program data 824. Application 822 may include a content transmitting and/or content managing algorithm 823 in a content processing system 100 (FIG. 1) that is arranged to perform the functions and/or operations as described herein including at least the functional blocks and/or operations described with respect to process 501 of FIG. 5 and process 601 of FIG. 6. Program Data 824 may include content data 825 for use in a content transmitting and/or content managing algorithm 823. In some example embodiments, application 822 may be arranged to operate with program data 824 on an operating system 821 such that implementations of mobile sampling may be provided as described herein. This described basic configuration is illustrated in FIG. 8 by those components within dashed line 801.

Computing device 800 may have additional features or functionality, and additional interfaces to facilitate communications between the basic configuration 801 and any required devices and interfaces. For example, a bus/interface controller 840 may be used to facilitate communications between the basic configuration 801 and one or more data storage devices 850 via a storage interface bus 841. The data storage devices 850 may be removable storage devices 851, non-removable storage devices 852, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 820, removable storage 851 and non-removable storage 852 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 800. Any such computer storage media may be part of device 800.

Computing device 800 may also include an interface bus 842 for facilitating communication from various interface devices (e.g., output interfaces, peripheral interfaces, and communication interfaces) to the basic configuration 801 via the bus/interface controller 840. Example output interfaces 860 may include a graphics processing unit 861 and an audio processing unit 862, which may be configured to communicate to various external devices such as a display or speakers via one or more A/V ports 863. Example peripheral interfaces 860 may include a serial interface controller 871 or a parallel interface controller 872, which may be configured to communicate with external devices such as input devices (e.g., keyboard, mouse, pen, voice input device, touch input device, etc.) or other peripheral devices (e.g., printer, scanner, etc.) via one or more I/O ports 873. An example communication interface 880 includes a network controller 881, which may be arranged to facilitate communications with one or more other computing devices 890 over a network communication via one or more communication ports 882. A communication connection is one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), infrared (IR) and other wireless media. The term computer readable media as used herein may include both storage media and communication media.

Computing device 800 may be implemented as a portion of a small-form factor portable (or mobile) electronic device such as a cell phone, a personal data assistant (PDA), a personal media player device, a wireless web-watch device, a personal headset device, an application specific device, or a hybrid device that includes any of the above functions. Computing device 800 may also be implemented as a personal computer including both laptop computer and non-laptop computer configurations. In addition, computing device 800 may be implemented as part of a wireless base station or other wireless system or device.

Some portions of the foregoing detailed description are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is here, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing device, that manipulates or transforms data represented as physical electronic or magnetic quantities within memories, registers, or other information storage devices, transmission devices, or display devices of the computing device.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or a firmware configuration; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), ARM Processors, CPUs or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of the skilled in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, Flash Memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact, many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for the sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While certain exemplary techniques have been described and shown herein using various methods and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter also may include all implementations falling within the scope of the appended claims, and equivalents thereof.

I claim:

1. An object event detection device, comprising:
    an event detection unit configured to detect an occurrence of a first predetermined event and an elapse of time after the occurrence of the first predetermined event, wherein the first predetermined event is associated with an object coupled to the object event detection device; and
    a signal transmitting unit configured to transmit a first signal relating to a first content associated with the object, wherein the first content is determined in response to the detection of the occurrence of the first predetermined event and the elapse of time, the first content is for advertising the object, and the first signal is for controlling processing of the first content.

2. The object event detection device as recited in claim 1, wherein
    the first signal includes content data.

3. The object event detection device as recited in claim 2, further comprising
    memory storage configured to store the content data.

4. The object event detection device as recited in claim 1, wherein
    the first signal includes a content identifier.

5. The object event detection device as recited in claim 1, wherein
    the first signal includes control information to control processing of the first content associated with the object.

6. The object event detection device as recited in claim 1, wherein
    the first signal includes control information indicative of a type of information included in the first signal.

7. The object event detection device as recited in claim 1, wherein
    the first signal is an ultra-sonic frequency signal.

8. The object event detection device as recited in claim 1, further comprising
    memory storage configured to store a set of conditions for transmitting the first signal relating to the first content associated with the object.

9. The object event detection device as recited in claim 1, wherein
    the event detection unit includes a sensor unit configured to detect movement of the object.

10. The object event detection device as recited in claim 1, wherein
    the event detection unit is further configured to detect an occurrence of a second predetermined event, and
    the signal transmitting unit is further configured to transmit a second signal relating to a second content associated with the object, in response to the detection of the occurrence of the second predetermined event.

11. The object event detection device as recited in claim 1, wherein
the event detection unit is further configured to detect an occurrence of a second predetermined event, and
the signal transmitting unit is further configured to transmit a second signal to control operations associated with the first content, in response to the detection of the occurrence of the second predetermined event.

12. A content processing system, comprising:
an object event detection device having
an event detection unit configured to detect an occurrence of a first predetermined event and an elapse of time after the occurrence of the first predetermined event, wherein the first predetermined event is associated with an object coupled to the object event detection device, and
a signal transmitting unit configured to transmit a first signal relating to a first content associated with the object, wherein the first content is determined in response to the detection of the occurrence of the first predetermined event and the elapse of time, and the first content is for advertising the object; and
a content management device having
a signal receiving unit configured to receive the first signal from the object event detection device, and
a content retrieving unit configured to perform an action to the first content based on the first signal, wherein the action is for controlling processing of the first content.

13. The content processing system as recited in claim 12, wherein
the content retrieving unit is configured to retrieve content data for the first content from the first signal.

14. The content processing system as recited in claim 12, wherein
the content management device further comprises a content database configured to store one or more contents corresponding to one or more content identifiers, and
the content retrieving unit is further configured to retrieve the first content from the content database based at least in part on a first content identifier contained in the first signal.

15. The content processing system as recited in claim 12, wherein
the content retrieving unit is further configured to retrieve the first content from a content database through a network based at least in part on a first content identifier contained in the first signal.

16. The content processing system as recited in claim 12, further comprising
an authentication unit configured to verify whether the content management device is authorized to retrieve the content data.

17. The content processing system as recited in claim 12, further comprising
an output unit configured to control outputting of the content data based on control information included in the first signal.

18. A signal transmitting method, comprising:
detecting an occurrence of a predetermined event and an elapse of time after the occurrence of the predetermined event, wherein the predetermined event is associated with an object; and
transmitting a signal relating to a content associated with the object, wherein the content is determined in response to the detecting of the occurrence of the predetermined event and the elapse of time, the content is for advertising the object, and the signal is for controlling processing of the content.

19. The method as recited in claim 18, wherein
the occurrence of the predetermined event and the signal relating to the content are detected and/or transmitted by an object event detection device coupled to the object.

20. The method as recited in claim 18, wherein the method is embodied in a machine-readable medium as a set of instructions which, when executed by an object event detection device, cause the object event detection device to perform the method.

21. The method as recited in claim 18, wherein the detected predetermined event associated with the object indicates the object is being picked up, and the signal includes control information to start outputting the content.

22. The method as recited in claim 18, wherein the detected predetermined event associated with the object indicates a period of time is elapsed after the object is picked up, and the signal includes control information to stop outputting the content.

23. A content management method, comprising:
receiving a signal relating to a content associated with an object, wherein the signal is generated in response to detecting an occurrence of a predetermined event associated with the content and an elapse of time after the occurrence of the predetermined event, wherein the content is for advertising the object and the signal is for controlling processing of the content; and
retrieving the content when the signal includes content data or a content identifier for the content or
performing an action to the content when the signal includes control information having a control operation requested to be performed.

24. The method as recited in claim 23, wherein the signal relating to the content is received, the content is retrieved, and/or the action to the content is performed by a content management device.

25. The method as recited in claim 23, wherein the method is embodied in a machine-readable medium as a set of instructions which, when executed by a content management device, cause the content management device to perform the method.

26. The method as recited in claim 23, wherein the performing the action to the content comprising
upon a determination that the control operation is to output the content data, outputting the content data via an output device.

27. The method as recited in claim 26, wherein the performing the action to the content comprising
upon a determination that the control operation is to stop outputting the content data, stopping the outputting of the content data via the output device.

* * * * *